Oct. 20, 1931. M. ANDERSON Re. 18,230

BRACELET CHAIN

Original Filed April 20, 1931

INVENTOR.
Maurice Anderson
BY
Barlow & Barlow
ATTORNEYS.

Reissued Oct. 20, 1931

Re. 18,230

UNITED STATES PATENT OFFICE

MAURICE ANDERSON, OF EDGEWOOD, CRANSTON, RHODE ISLAND, ASSIGNOR TO LEVY, ANDERSON CO., INC., OF PROVIDENCE, RHODE ISLAND, A CORPORATION OF RHODE ISLAND

BRACELET CHAIN

Original No. 1,810,590, dated June 16, 1931, Serial No. 531,349, filed April 20, 1931. Application for reissue filed July 10, 1931. Serial No. 550,016.

This invention relates to a bracelet chain; and has for its object to provide a chain of such construction that its hinge connection between the links will not be noticeable in the bracelet when worn.

A further object of the invention is to provide a connection between the links with the ends of the links in close engagement one with the other.

A still further object of the invention is to provide a connection between the links with the top wall of the links being in a single plane notwithstanding the overlapping portion for connecting purposes.

Another object of the invention is to provide a link of thin sheet stock and suitably stiffen the link by manipulation of the stock as by bending or flanging the same.

Another object of the invention is to provide a link with a relatively large portion of its stock removed, as from its center, and to then stiffen the remaining part by flanging or bending the metal.

With these and other objects and advantageous features in view, the invention consists of novel arrangements of parts more fully disclosed in the detailed description following, in conjunction with the accompanying drawings, and more particularly set forth in the appended claims.

In the drawings:

Fig. 3 is a perspective view of one of the links;

Figure 1:
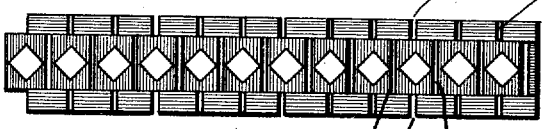
Fig. 1 is a top plan view of a portion of the chain.
Figure 2:
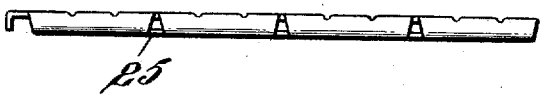
Fig. 2 is a side elevation thereof.
Figure 4:
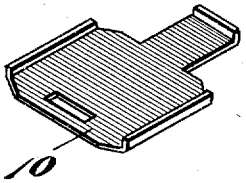
Fig. 4 is a top view of the link as blanked from sheet stock.
Figure 5:
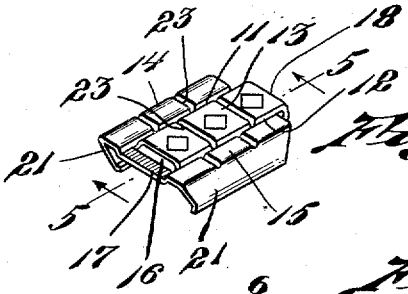
Fig. 5 is a section on the line 5—5 of Figure 3.
Figure 6:
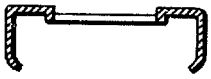
Fig. 6 is a section on the line 6—6 of Figure 5.
Figure 5:
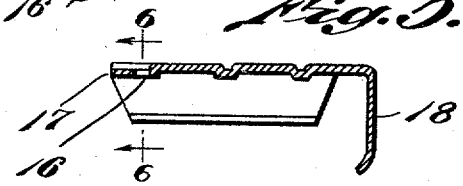

It is found desirable in the construction of chains which are worn for personal adornment such as bracelets, to provide a construction which will enhance the appearance of the bracelet, and in order to form a bracelet embodying these desirable features, I have caused the links to be connected together in a closely abutting relation with the overlapping portion of one link lying in a depressed or deflected portion of the other link so as to maintain the top surface of the links in a single plane; and the following is a detailed description of the present embodiment of this invention illustrating the preferred means by which these advantageous results may be accomplished.

With reference to the drawings, 10 designates one of the link blanks which is formed by folding into the shape illustrated in Figure 3, having a top wall with longitudinal grooves 11 and 12 forming a central section 13 with bordering sections 14 and 15. This central section 13 is provided with an opening 16 adjacent one end thereof, and a portion of the stock 17 between this opening and the end of the link is deflected or depressed from the top wall, the thickness of the tongue 18 which extends from the opposite end of this section so that when this tongue lies in this depression its top surface 19 will be flush or in the same plane with the top surface 20 of the adjacent link as clearly illustrated in Figure. 7.

Figure 7:
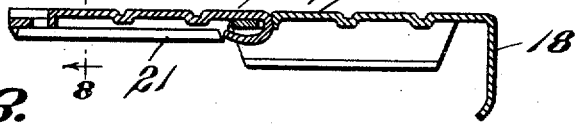
Fig. 7 is a central section of two of the links hinged together and partially folded toward final position.
Figure 8:
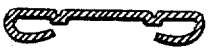
Fig. 8 is a section on the line 8—8 of Figure 7.

To join the links together the tongue 18 is passed through the opening 16 and folded beneath the portion 17, as shown in Figure 7, to hingedly connect the parts together, and the side walls 21 of each of the links, are rolled inwardly so that their bottom surfaces lie substantially in the plane of the bottom surface of the tongue 18, to evenly support the bracelet chain upon the wrist, and at the same time provide a smooth and increased surface which will not abrade the wrist or catch and tear any of the fabric of a woman's garment with which it may come in contact.

Each of the links is further provided with laterally extending grooves 23 which are spaced apart to cause each of the side sections and the central section to have a block-like appearance and as the joint between the links, as illustrated at 24, in Fig. 1, also forms in effect one of these depressions, the bracelet has the appearance of continuity throughout and the joints 24 are indistinguishable from the ornamental depressions 23, which is a desirable result in obtaining unity of appearance.

In this structure, each of the side walls is beveled as at 25, in order to allow flexibility of the structure and hinging action of the links.

Figure 10:
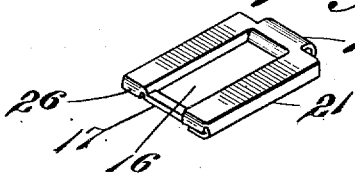
Fig. 10 is a perspective view of a modified form of link showing an open center.
Figure 9:
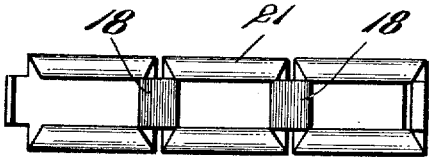
Fig. 9 is a bottom view of a portion of the bracelet in finished folded position.

It will of course be understood that the center portion of the link may be cut out by enlarging the opening 16, as illustrated in Fig. 10, to form a generally rectangular open center link. The removal of such stock weakens the link and in order to overcome this weakness I flange the link about its inner marginal edge by drawing the stock downwardly and also draw down a flange or roll the outer edge of the link, as described in the other modification and provide end flanges 26, to stiffen the link and form a finished appearance and permit of easy flexibility.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a bracelet chain, a plurality of interconnected links, each link being a generally thin unit of generally restangular form, embodying a thin sheet metal top wall with an opening therethrough, the stock of the top wall between said opening and one end of the link being deflected downwardly substantially the thickness of the stock of the top wall, and the stock at the other end of the link extending beyond the end thereof and folded closely about the deflected portion of the next link to have its top surface lie flush with the top surface thereof, and the sides of each link being folded thereunder on an arc of short radius and continued to lie close to the under surface of said top wall and flush with the outer surface of said end extension, whereby a compact and relatively thin stiffened unit link is formed and connected in a chain with a flush top surface and a smooth back.

2. In a bracelet chain, a plurality of interconnected links, each link being a generally thin unit of generally rectangular form, embodying a thin sheet metal top wall with an open center forming longitudinal sides and transverse bars, one of said bars being deflected downwardly substantially the thickness of the stock of the top wall, and the stock at the other end of the link extending beyond the end bar thereof and folded closely about the deflected bar of the next link to have its top surface lie flush with the top surface of said sides, and the sides of each link being folded thereunder on an arc of short radius and continued to lie close to the under surface of said top wall to stiffen the same and with the outer under surface of said sides flush with the outer under surface of said end extension, whereby a compact and relatively thin stiffened unit link is formed and connected in a chain with a flush top surface and a smooth back.

3. In a bracelet chain, a plurality of interconnected links, each link being a generally thin unit of generally rectangular form, embodying a thin sheet metal top wall with an open center forming longitudinal sides and transverse bars, one of said bars being deflected downwardly substantially the thickness of the stock of the top wall, and the stock at the other end of the link extending beyond the end bar thereof and folded closely about the deflected bar of the next link to have its top surface lie flush with the top surface of said sides, the marginal edges about said opening being flanged downwardly from the top wall and the sides of each link being folded under the top wall to lie close to the under surface of said top wall and substantially meet the flanges about said opening and with the outer under surface of said sides flush with the outer under surface of said end extension, whereby a compact and relatively thin unit chain is formed with a flush top surface and a smooth back.

4. In a bracelet chain, a plurality of interconnected links, each link being a generally thin unit of generally rectangular form, embodying a thin sheet metal top wall with an open center forming longitudinal sides and transverse bars, one of said bars being deflected downwardly substantially the thickness of the stock of the top wall, and the stock at the other end of the link extending beyond the end bar thereof and folded closely about the deflected bar of the next link to have its top surface lie flush with the top surface of said sides and the sides of each link being folded thereunder on an arc of short radius and continued to lie close to the under surface of said top wall with the under surface of said sides flush with the outer under surface of said end extension, whereby a compact and relatively thin unit chain is formed with a flush top surface and a smooth back, the marginal edges about said sides being flanged downwardly from the top wall to present a finished appearance.

5. In a bracelet chain, a plurality of body links, means for connecting said body links together, each body link being generally thin and of generally rectangular form embodying a thin sheet metal top wall with an open center forming longitudinal sides and transverse bars, the sides of each link being folded thereunder on an arc of short radius to lie close to the under surface of the top wall, whereby a compact and relatively thin but stiffened link is formed with a smooth back.

6. In a bracelet chain, a plurality of body links, means for connecting said body links together, each body link being generally thin and of generally rectangular form embodying a thin sheet metal top wall with an open center forming longitudinal sides and transverse bars, the marginal edges about said opening being flanged downwardly from the top wall to stiffen the link and present a finished appearance.

7. In a bracelet chain, a plurality of body links, means for connecting said body links together, each body link being generally thin and of generally rectangular form embodying a thin sheet metal top wall with an open center forming longitudinal sides and transverse bars, the marginal edges about said opening being flanged downwardly from the top wall to stiffen the link, and the sides of each link being folded thereunder on an arc of short radius to lie close to the under surface of the top wall, whereby a compact and relatively thin but stiffened link is formed with a smooth back.

8. In a bracelet chain, a plurality of interconnected links, each link being a generally thin unit of generally rectangular form, embodying a thin sheet metal top wall with an open center forming longitudinal sides and transverse bars, and the stock at one end of the link extending beyond the end bar thereof and folded closely about the opposite bar of the next link, the sides of each link being folded thereunder on an arc of short radius and continued to lie close to the under surface of said top wall, whereby a compact and relatively thin unit chain is formed with a smooth back, the marginal edges about said opening being flanged downwardly from the top wall to present a finished appearance and stiffen the link.

In testimony whereof I affix my signature.

MAURICE ANDERSON.